Sept. 2, 1930.  E. V. CRANE  1,774,915
MACHINE FOR MAKING SPIKES
Filed Jan. 4, 1928  9 Sheets-Sheet 1

Fig.1ª

INVENTOR:
Edward V. Crane,
By Attorneys,
Fraser, Myers & Manley

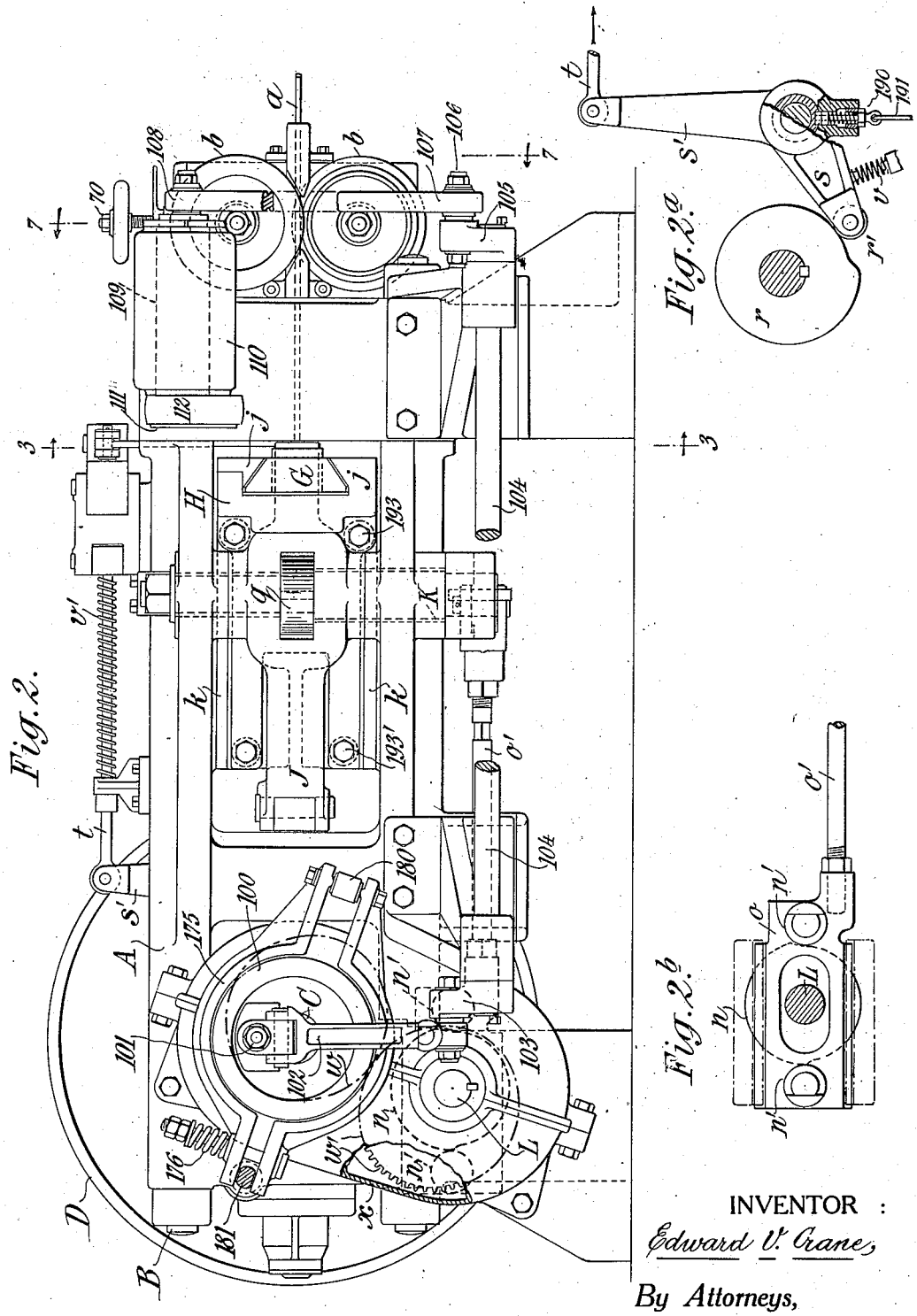

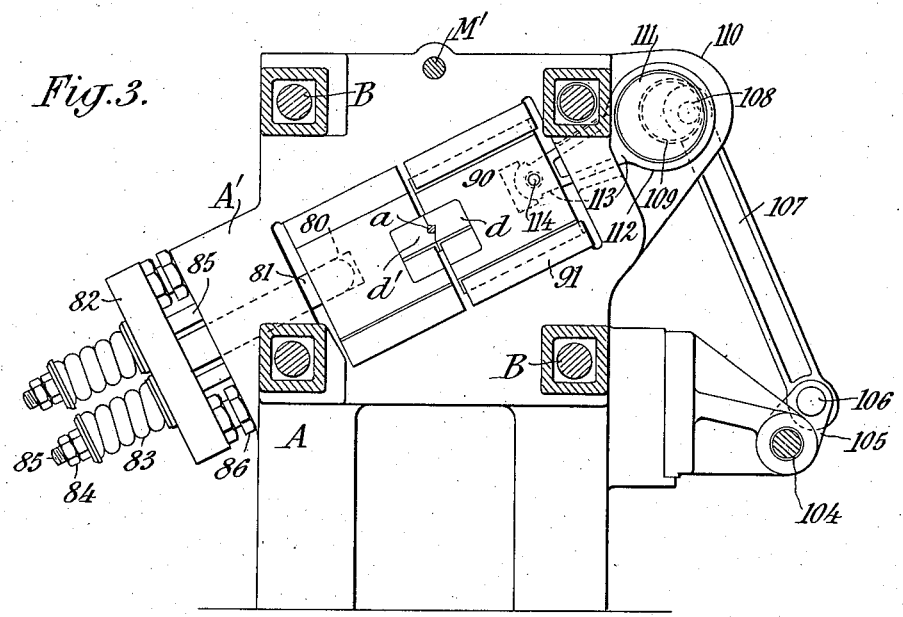
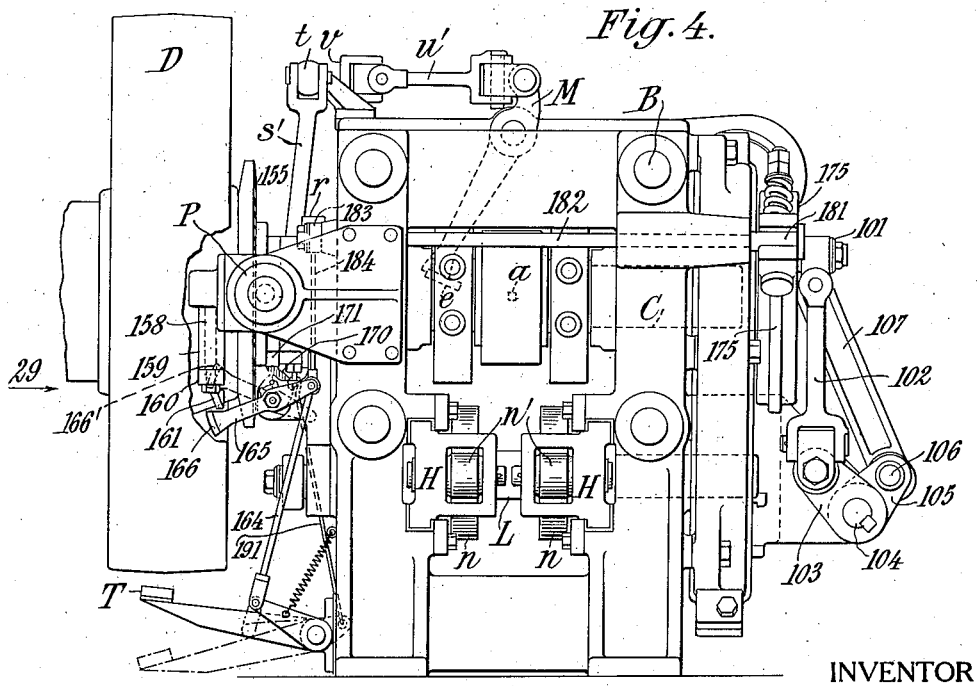

Sept. 2, 1930.  E. V. CRANE  1,774,915
MACHINE FOR MAKING SPIKES
Filed Jan. 4, 1928  9 Sheets-Sheet 4
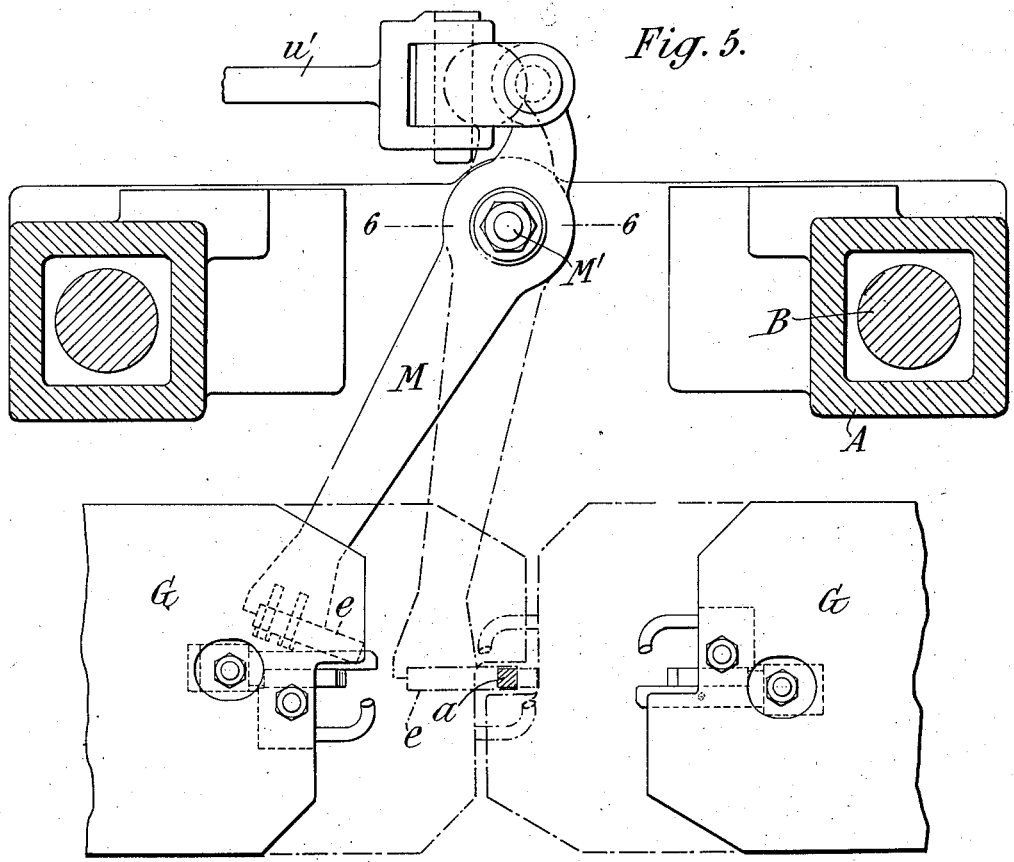
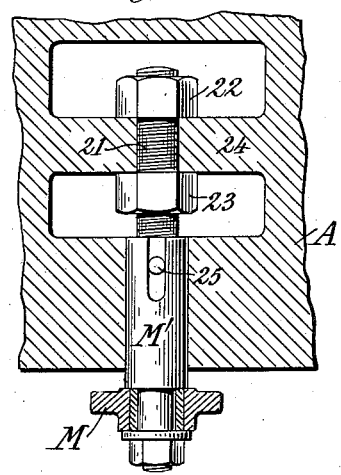
INVENTOR:
Edward V. Crane
By Attorneys,
Fraser, Myers & Manley Sept. 2, 1930.  E. V. CRANE  1,774,915
MACHINE FOR MAKING SPIKES
Filed Jan. 4, 1928  9 Sheets-Sheet 5

INVENTOR:
Edward V. Crane,
By Attorneys,
Fraser, Myers & Manley

Sept. 2, 1930. E. V. CRANE 1,774,915
MACHINE FOR MAKING SPIKES
Filed Jan. 4, 1928 9 Sheets-Sheet 6
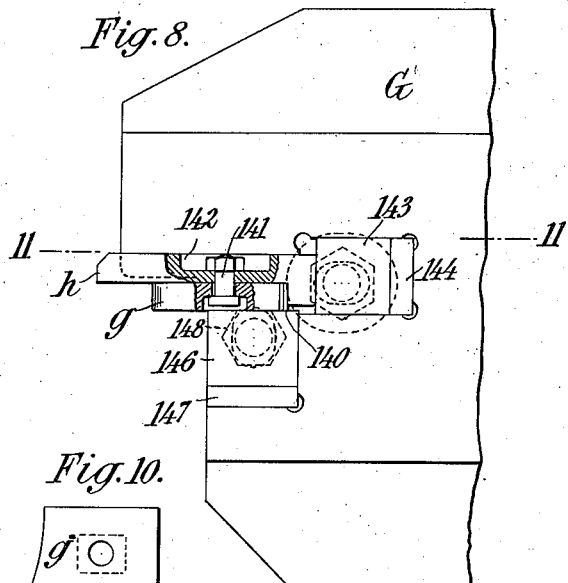
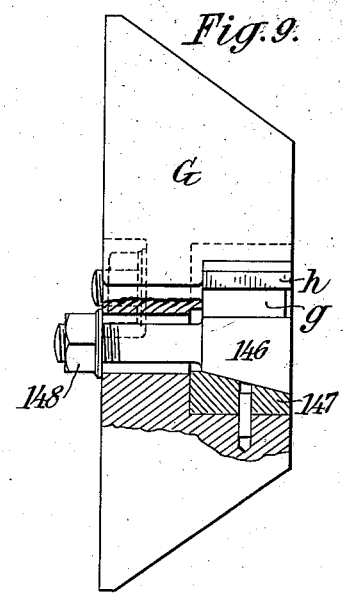
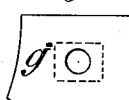
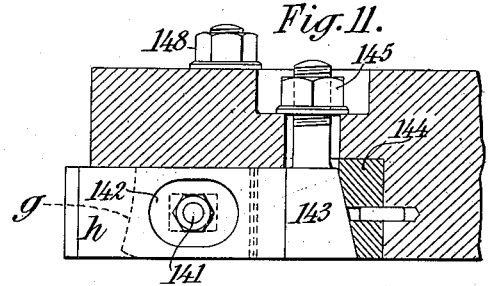
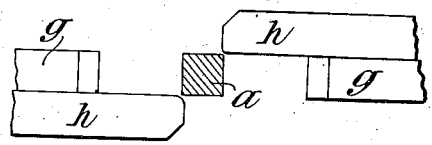
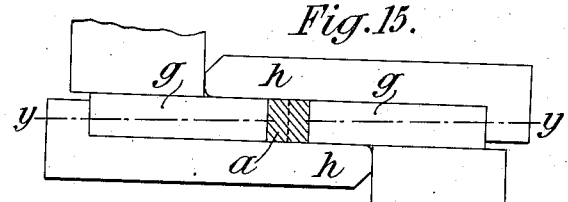
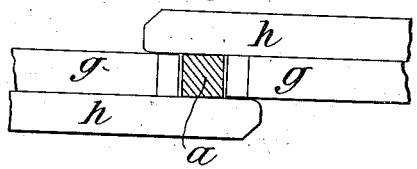
INVENTOR:
Edward V. Crane,
By Attorneys,
Fraser, Myers & Manley

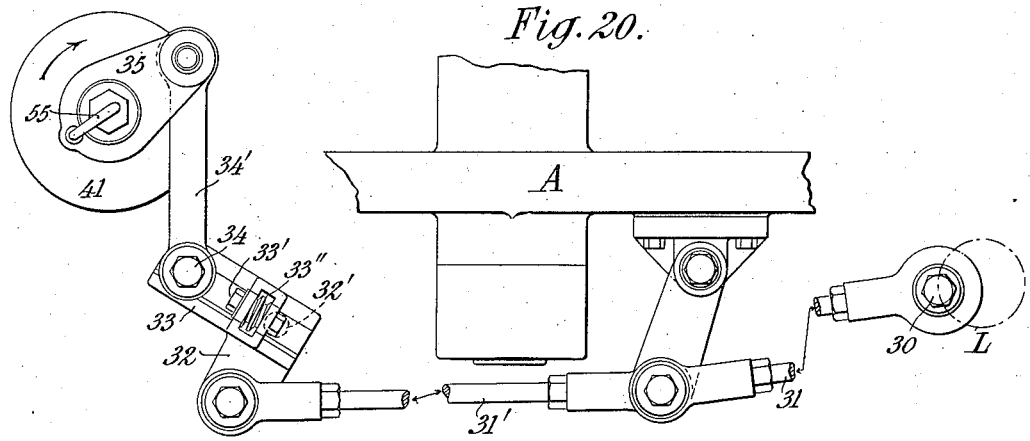
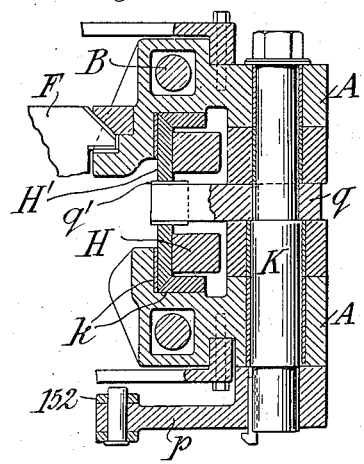
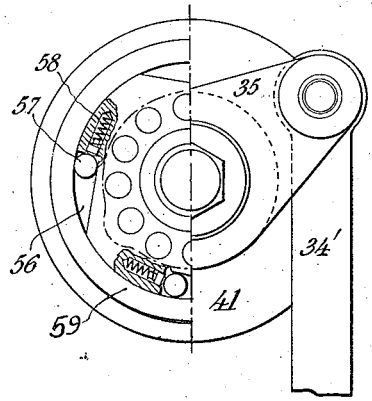
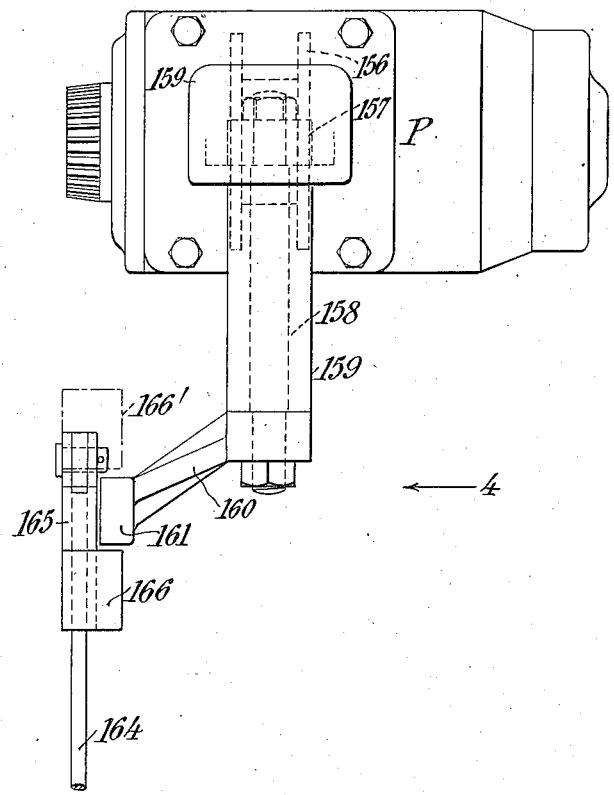

INVENTOR:
Edward V. Crane,
By Attorneys,
Fraser, Myers & Manley

Sept. 2, 1930.  E. V. CRANE  1,774,915
MACHINE FOR MAKING SPIKES
Filed Jan. 4, 1928     9 Sheets-Sheet 9
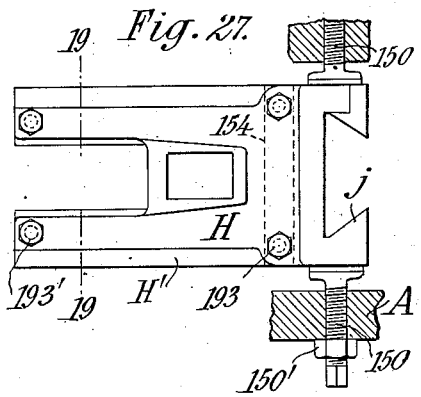
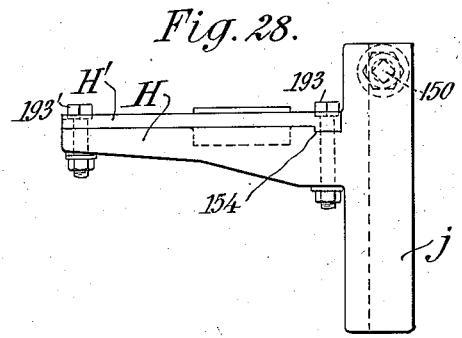
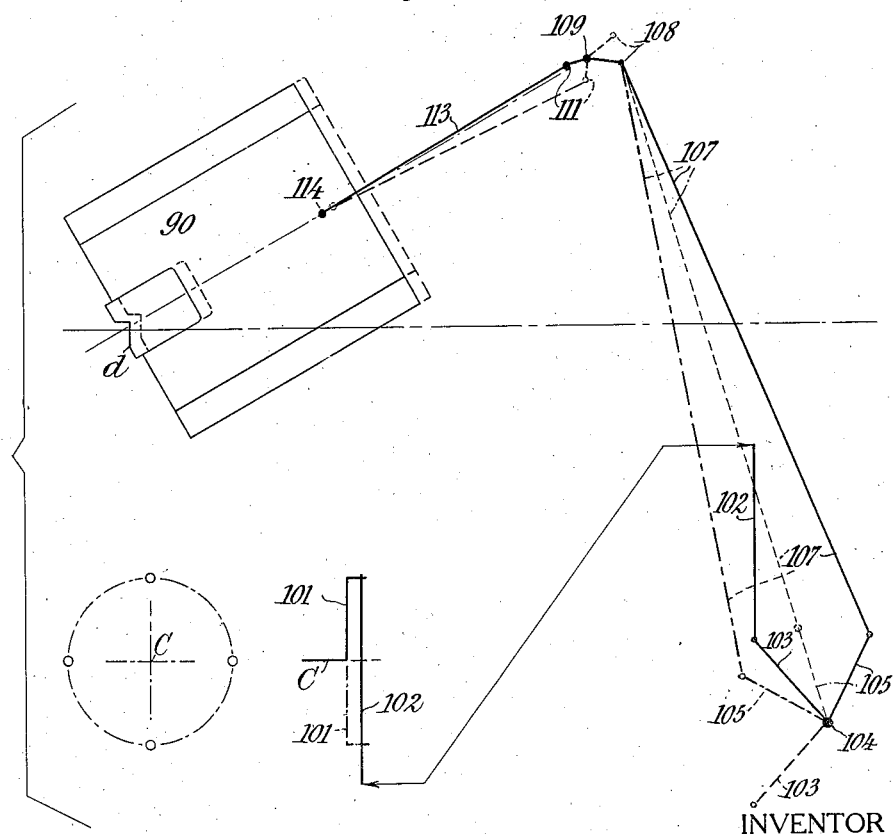
INVENTOR
Edward V. Crane,
By Attorneys, Patented Sept. 2, 1930

1,774,915

UNITED STATES PATENT OFFICE

EDWARD V. CRANE, OF BROOKLYN, NEW YORK, ASSIGNOR TO E. W. BLISS COMPANY, OF BROOKLYN, NEW YORK, A CORPORATION OF DELAWARE

MACHINE FOR MAKING SPIKES

Application filed January 4, 1928. Serial No. 244,432.

This invention provides an improved construction of machine designed especially for making spikes scuh as are used for spiking railway rails to ties, although applicable to the making of other more or less similar articles.

The machine is adapted to perform the following series of operations, viz: A stock bar, square or approximately so in cross-section, and usually worked hot, is fed intermittently, being gripped in its stopping positions by clamping dies; the feed leaves a certain length of the bar projecting beyond the dies, and a hammer then strikes this end portion laterally to bend it sidewise; a reciprocating hammer then approaches endwise and swages the bent end of the bar against the clamping dies to form the head of the spike; the hammer recedes and the dies open, whereupon the bar is fed forward a distance corresponding to the length of the spike to be made, and is then re-clamped between the dies; while thus held, lateral pointing dies approach from opposite sides and swage the bar to form its pointed end and to cut it off, whereupon the finished spike falls out of the machine.

The nature of the invention will become apparent as the description proceeds.

The spike machine constituting the preferred embodiment of the invention is shown in the accompanying drawings, wherein—

Figure 1 is a plan view partly in horizontal section.

Fig. 1ᵃ is an enlarged fragment of Fig. 1.

Fig. 2 is a side elevation, partly broken away.

Figs. 2ᵃ and 2ᵇ are fragmentary views showing parts which are not fully apparent in Fig. 2.

Fig. 3 is a transverse section in the plane of the line 3—3 in Figs. 1 and 2.

Fig. 4 is an end elevation viewed from the left in Figs. 1 or 2.

Fig. 5 is a transverse section on a larger scale, showing the lateral bending hammer and the pointing and cutting dies in two positions, the view looking in the same direction as Fig. 4, and being in transverse section in a plane approximating that indicated by the line 5—5 in Fig. 1.

Fig. 6 is a transverse section on the line 6—6 in Fig. 5, showing the construction of the stud on which the lateral bending hammer is mounted.

Fig. 8 is an elevation of one of the pointing die slides with its dies, being partly broken away in section.

Fig. 9 is an end elevation thereof viewed from the left in Fig. 8.

Fig. 10 is a plan of one of the pointing dies removed.

Fig. 11 is a horizontal section on the line 11—11 in Fig. 8.

Figs. 12, 13, 14 and 15 are elevations of the dies in four successive positions, showing their approach and engagement from opposite sides of the bar.

Fig. 19 is a transverse section on the line 19—19 in Fig. 1.

Fig. 20 is a side elevation showing the feed transmission.

Fig. 25 is a sectional elevation of part of the feed mechanism shown in Fig. 20.

Fig. 26 is a diagram of the gripper operating mechanism.

Figs. 27 and 28 are a side elevation and plan of the slide which carries the pointing die slide.

Fig. 29 is a view from the left in Fig. 4, showing the governor clutch control.

Figure 7:
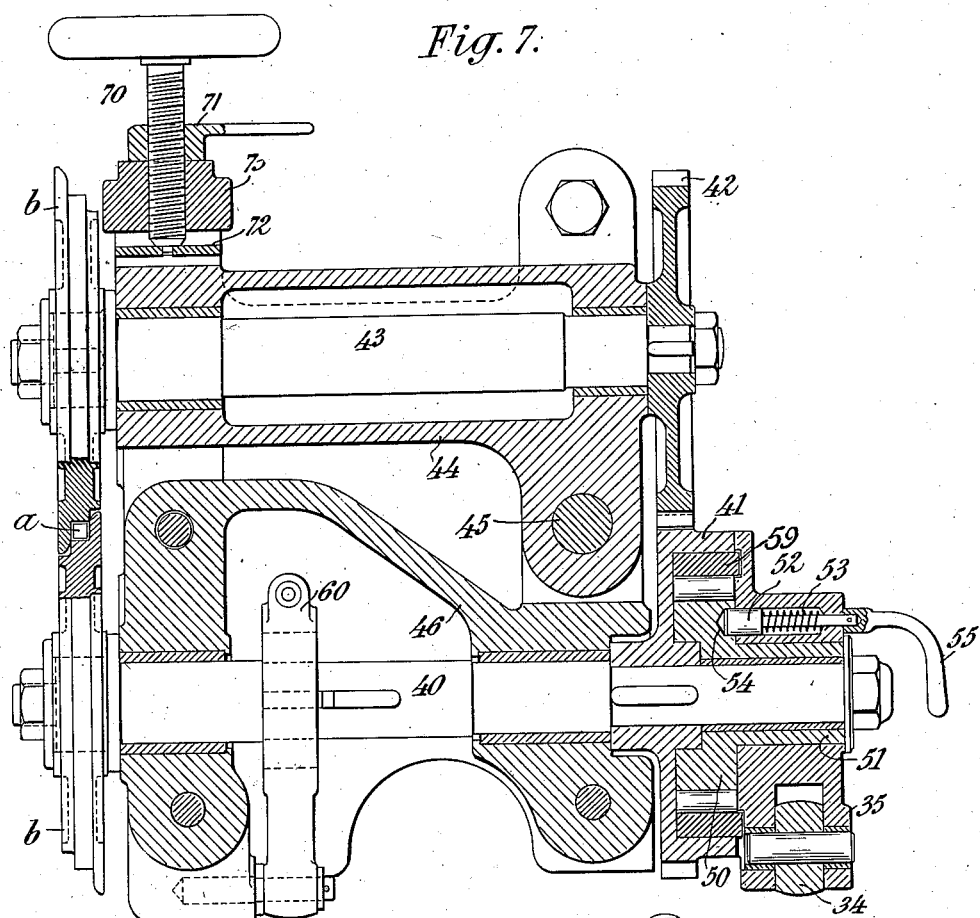
Fig. 7 is a transverse section of the feeding means on the line 7—7 in Fig. 2.
Figure 16:
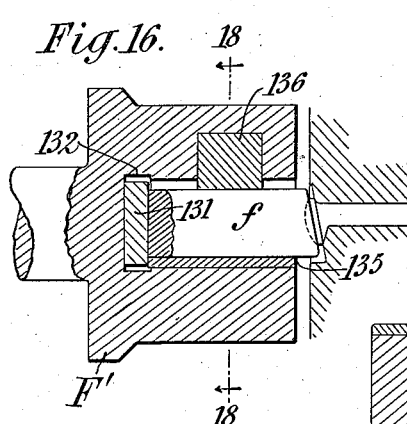
Fig. 16 is a sectional plan in the plane of the axis of the bar or spike, showing the swaging hammer at the end of its stroke for forming the head of the future spike.
Figure 21:
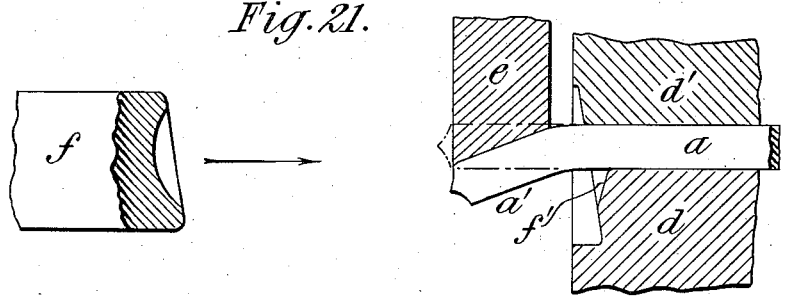
Fig. 21 is a diagrammatic plan view showing the operation of laterally bending the end of the stock bar.
Figure 22:
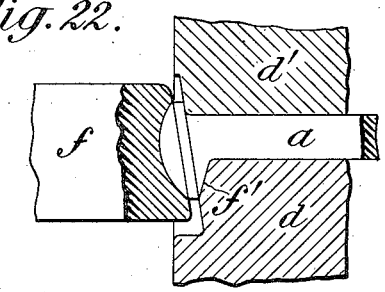
Fig. 22 is a similar view showing the head-swaging operation.
Figure 23:
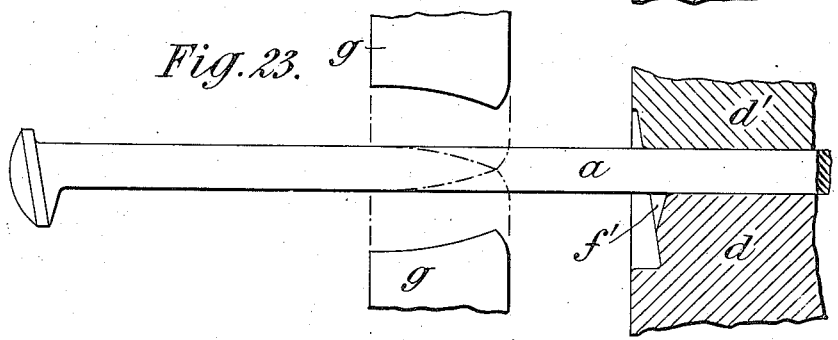
Fig. 23 is a similar view showing the bar after the next feeding operation.
Figure 24:
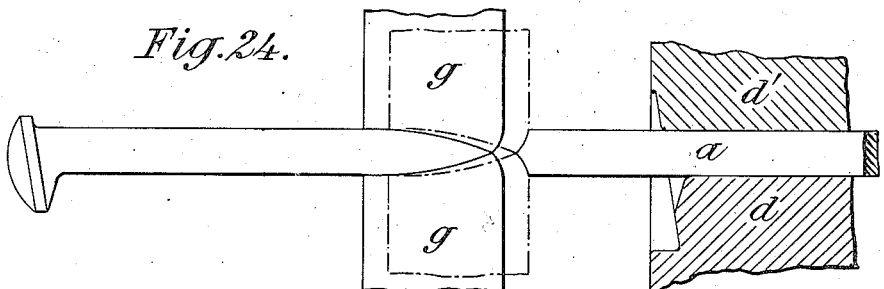
Fig. 24 is a similar view showing the operation of the pointing and cutting dies.

The machine can be best understood by first describing the sequence of operations performed on the stock bar. For a standard railway spike this bar is square and of the cross-section of the shank of the spike. The bar is shown at $a$ in Figs. 1 and 2, where it enters the machine, and in cross-section in Figs. 3 and 5, and in Figs. 12–15. It is fed forward intermittently by any suitable feed mechanism, preferably by feed rolls $b\ b$ (Figs. 2 and 7). These rolls are rotated intermittently by means to be described later. The bar, after passing the feed rolls, enters a funnel-shaped guide $c$ (Fig. 1), which directs it centrally between gripping dies $d\ d'$, shown in Figs. 1, 3 and 21. These gripping dies are relatively movable so as to open during the feeding movements of the rod and close to grip it during the operations upon the rod. The rod left after the completion of the previous spike is held so that its end projects beyond the dies in the manner shown in dotted lines in Fig. 21. Being gripped by the dies, a laterally-operating hammer $e$ approaches from one side and strikes the projecting end of the bar, bending it over to the position shown in full lines in Fig. 21. The projecting and bent-over portion $a'$ constitutes the stock from which the head of the spike is to be formed. As the hammer $e$ recedes out of the way, a head-swaging ram $f$ moves up and swages the head as shown in Fig. 22. This ram may be formed to give any desired shape to the head of the spike, but for a standard A. R. E. A. spike the head is formed with oblique outer and overhanging faces, as shown in Figs. 16 and 22. For this purpose the gripping jaw $d$ has a cavity $f'$ by which the under side of the head is shaped, its edge flange being formed between the ram and die. The head having been thus formed, the ram $f$ recedes, the jaws $d\ d'$ separate, and the bar is then fed forward, as shown in Fig. 23, a distance corresponding to the desired length of the spike, so as to leave projecting beyond the dies $d\ d'$ not only the total length of the spike, but also sufficient to leave again a protruding portion corresponding to that shown in dotted lines in Fig. 21. Thereupon pointing and cutting dies $g\ g$ approach from opposite sides, as shown in Fig. 23, and enter the blank while it is held fast by the dies $d\ d'$. These cutting dies penetrate the blank, as shown by dotted lines in Fig. 23, and in so doing displace the metal from opposite sides. To prevent the metal thus displaced from bulging out on the upper and lower sides of the blank, which would form a flash or distortion at the pointed end of the spike, the pointing dies $g\ g$ are provided also with confining dies $h\ h$, best shown in Figs. 8 to 15, which, as the dies come together, embrace the metal above and below, as shown in Fig. 14, and confine it until the end of the point swaging stroke when they occupy the positions shown in Fig. 15. Thus the displaced metal is forced endwise of the spike, so that its previously formed head is carried away from the bar $a$ which is held clamped between the dies $d\ d'$. The pointing dies are also cutting dies, and, as they come together, sever, or substantially so, the point of the spike from the end of the stock bar $a$. But such dies, unless adjusted with the utmost nicety, may fail to entirely sever the metal; this result may be due to the slight spring of the operating parts, or it may be due to wearing of the points of the dies, but in any case there is liability that the spike may not be completely severed from the stock bar. To insure such severance even if the cutting dies do not absolutely sever the bar, a bodily movement is imparted to these dies, as illustrated in Fig. 24. Thus the dies $g\ g$, after approaching and swaging the point, move away from the dies $d\ d'$ in a direction longitudinally of the bar and pull the point of the spike away from the remaining stock bar. This movement is from the position shown in dotted lines in Fig. 24 to the position shown in full lines in that figure. This movement severs by pulling apart any slight fin that may be left through imperfect cutting. Thereupon the cutting dies $g\ g$ separate and the completed spike is dropped out. The operations thus described are then repeated.

Proceeding now to a description of the machine: The working parts are mounted on any suitable framework, which in the precise construction shown comprises side frames or members A A and end frames having suitable feet and being partly skeletonized, the preferred construction being to cast the parts and carry tie-rods B B through them to tie them together and resist the longitudinal tensile strains. A main shaft C has suitable bearings in these frames. This shaft C is driven from any suitable source, as a pulley D, the drive being through a clutch to be described later. The shaft C is formed with a crank C' which through a pitman E drives a reciprocating slide F, the forward end of which carries the heading ram $f$. The slide F moves in slideways $i$. The pointing and cutting dies $g\ g$ are carried on transverse slides G G which move in slideways $j$ formed on slides H H. One of the slides H is shown separately in plan in Fig. 28, and in side elevation in Fig. 27. The slides H are mounted on longitudinal slideways $k$ in the side frames A.

The movement of the cutting dies $g\ g$ toward and from each other is effected by taking motion from the slide F; links I I (Fig. 1) are connected to studs $l\ l$ on this slide, and their opposite ends are jointed to the long arms of rock levers J J which are pivoted on vertical shafts K K mounted in the side frames. The short arms of these levers J are pivotally connected to the slides G G so as to impart the lateral sliding movements to the latter. This connection is best made by giving the ends of the levers cylindrical form, as shown at m m, these ends being housed between sliding blocks m' m' engaged in slideways formed transversely in the slides G G, so as to take up the arc movement of the rounded ends of the lever arms and impart a direct parallel motion to the slides G G. (The described means and mechanical connections for operating the slides G G are similar to means set forth in application of Robert W. Strout for nail making machine, filed January 19, 1926, Patent No. 1,685,439, granted September 25, 1928.)

Figure 1:
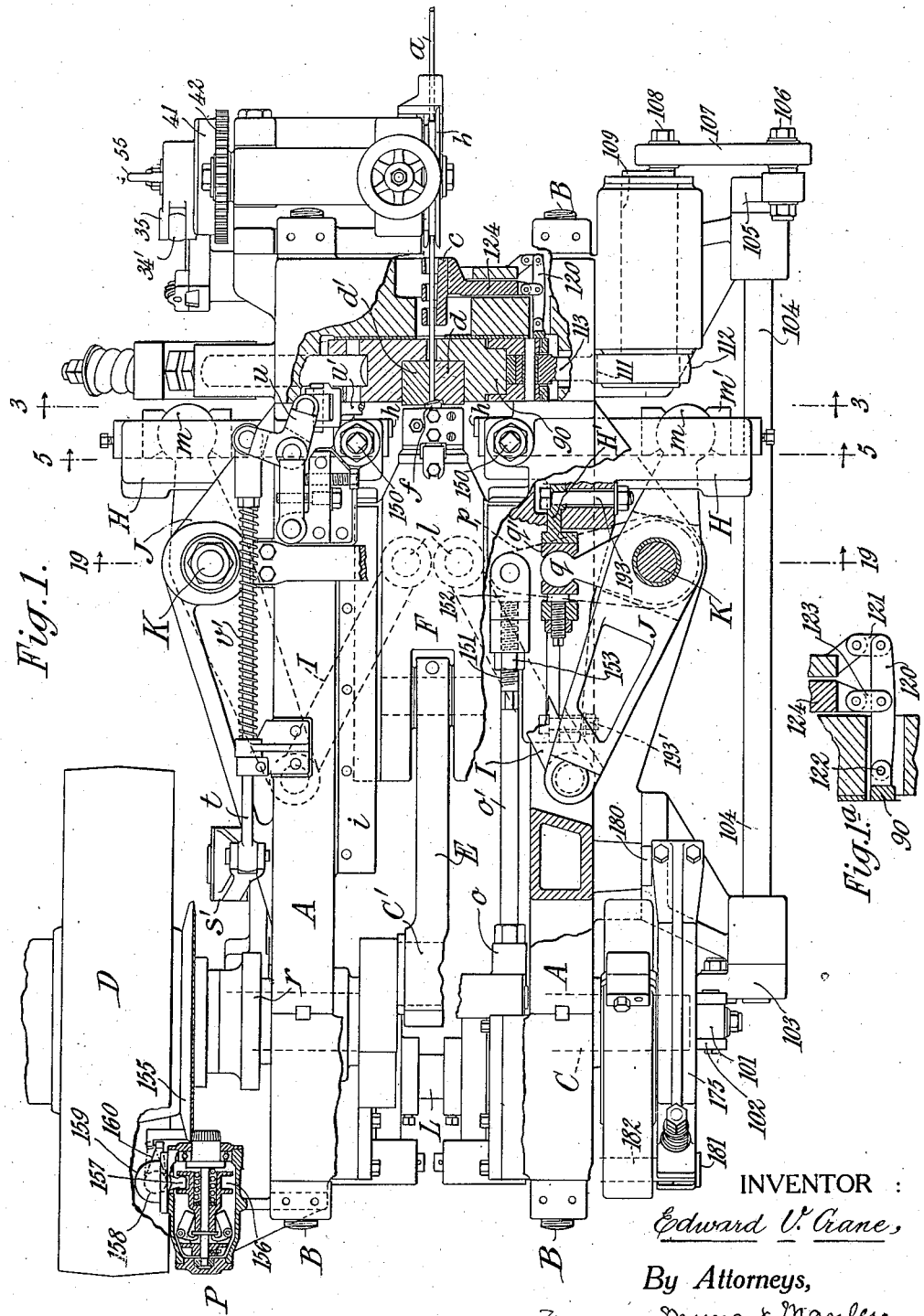

The slides H H carrying the transverse slides G G are given their movement longitudinally of the rod feed for severing any fin left after the pointing and cutting off of the spike by motion taken from the main shaft C; this shaft drives through gearing a lower shaft L which carries twin cams n n; on opposite sides of each cam n are two rollers n' n' (see Fig. 2ᵇ) mounted on studs on a slide o which is connected by a rod o' to an arm p, shown in Figs. 1 and 19, which arm is keyed on the bottom end of one of the shafts K above referred to; at a higher point on this shaft, and preferably between its bearings in the frame A, is keyed a shorter arm q, the end of which engages the slide H. This engagement is preferably as shown in Fig. 1, by forming the end of the arm of circular contour as a segment of a cylinder and confining it between blocks q' which are mounted to slide transverse, in a guiding opening in the slide H, so as to take up the arc movement of the cylindrical end of the arm q (being thus similar to the cylinrical ends m and blocks m' previously referred to). Thus the cams n n impart simultaneously like movement to the respective slides H H to carry the cutters from the positions shown in dotted lines in Fig. 24 to those shown in full lines in that figure, immediately after the pointing and cutting of the end of the spike; and then by a return movement at a suitable later point in the cycle of operations. The shaft C preferably drives the shaft L through eccentric gearing, as will be hereinafter described, although this is not essential to the operation of the slides H H.

The bending hammer e is driven also primarily from the shaft C; for this purpose the shaft C carries at one end a cam r (Fig. 2ᵃ) which acts upon a roller r' mounted on the short arm s of a lever s s'; the long arm s' of this lever is normally locked fast to the short arm; its upper end is connected by a rod t to an elbow lever u, (Fig. 1) and by a universally jointed rod u' (Fig. 4) to the short arm of lever M, the long arm of which carries the hammer e. Springs v v' (either or both) press the roller r' against the cam r and retract the hammer e to the position shown in Fig. 4. The lever M turns on a fixed stud M' (Fig. 5) which is set adjustably in the transverse portion of the main frame A in such manner that the lever M and hammer e may be adjusted in position longitudinally or parallel with the feed of the bar a, as may be required for adapting the machine to spikes of different dimensions or with different sizes or shapes of heads. This adjustment is accomplished as shown in Fig. 6, by forming the stud M' with a threaded portion 21 engaged by nuts 22, 23, embracing between them a portion 24 of the frame, the stud being held from turning by a key 25.

The feeding movements of the bar a are performed by communicating intermittent rotative movements to the feed rolls b b by movements taken preferably from the shaft L. For the most suitable timing of the feed movements it is desirable to drive the shaft L from the shaft C through eccentric gears w w', the pitch line of these gears being shown in Fig. 2, and a fragment of the gear w' being shown where the enclosing casing x for protecting these gears is broken out. (This construction of eccentric gear drive for the shaft from which the feed is taken, is shown in Figs. 12 to 16 of the aforesaid application of R. W. Strout, and forms in itself no part of the present invention; for a description of the function and operation of such eccentric drive, reference is made to the specification of that application). The shaft L carries on the opposite side of the machine from that shown in Fig. 2, a crank 30 which connects through any suitable connections to a swinging arm 35 turning freely around the axis of the lower feed roll b. The connections are preferably as shown in Fig. 20, where the crank 30 communicates motion through rods 31, 31' to the arm 32 of a bell-crank lever turning around an axis 32', its other arm 33 carrying a stud 34 which connects through a rod 34' with the swinging arm 35. The stud 34 is adjustable axially of the arm 33 in any suitable way, preferably by being mounted on a slide 33' which is adjustable by means of a worm 33'', whereby the stud 34 may be set at any desired radial distance from the axis 32', in order thereby to vary the extent of the feeding movement for adjusting the machine to make spikes of varying lengths. Referring to Fig. 7, the lower feed roll b is fixed on a shaft 40 having keyed to it a gear 41 meshing with a like gear 42 keyed on a normally parallel shaft 43 carrying the upper feed roll b (see Fig. 7). The upper shaft has its bearings in a swing frame 44 pivoted at 45 to the stationary bracket frame 46 carrying the bearings for the lower shaft 40. The connection between the swinging arm 35 and the shaft 40 is in the nature of a ratchet connection, preferably a friction ratchet, of any suitable or well-known type. The particular construction shown comprises a disk 50 having a hub 51 turning on the reduced end of the shaft 40 and forming a journal bearing for the hub of the arm 35; the disk 50 is locked to the arm 35 in any one of several positions by a bolt 52 which under the impulse of a spring 53 enters any one of a series of holes or sockets 54 formed in the disk 50, the bolt 52 being withdrawn by a handle 55 to remove it from one socket and let it enter another. The disk 50 forms the friction pawl element of the friction ratchet, having peripheral inclined notches 56 (see Fig. 25) each ending with an abrupt face and each receiving a roller 57 normally pressed out by a spring plunger 58, so that it seeks to enter the narrower portion of the recess formed by the notch 56; the rollers 57 engage the inner face of a ring 59 (Figs. 7 and 25) which is formed within a flange on the gear 41, being fixedly united to such gear, so that in the forward movement the rollers are wedged between the long incline of the notches 56 and the ring 59 and lock the two together so as to impart forward movement to the gear 41 and thereby to the two shafts and their feed rolls $b$ $b$; while on the return movement these rollers free themselves and the backward swing of the arm 35 is free. To prevent any frictional engagement resulting in a reverse rotation of the feed rolls during this free return movement, a friction brake 60 is applied, as shown in Fig. 7, yieldingly gripping a hub on the shaft 40 with sufficient traction to resist any such backward movement. The feed rolls $b$ $b$ are pressed together in usual manner by the adjustment of a screw 70 set in place by a set nut 71 and acting through a leaf spring 72 upon the frame 44 to press down the upper feed roll $b$ against the lower feed roll, which latter is carried in fixed bearings, the screw 70 reacting upwardly against a stationary crosshead 73. It results from this construction that the crank or eccentric 30 at each half turn of the shaft L imparts a feed movement to the feed rolls $b$ $b$, and on the next half turn there is a free or idle return movement, leaving the rolls and bar stationary.

For opening and closing the gripping dies $d$ $d'$ it is sufficient to apply motion to one of these dies, while to provide a suitable yielding engagement, the other die may be mounted on stiff springs or cushions. The dies $d$ $d'$ are preferably arranged to grip the bar $a$ obliquely, as shown in Fig. 3. The die $d'$ is carried on a slide 80 which is connected by a plunger rod 81 to a crosshead 82 which is seated on springs 83 which react against adjusting nuts 84 on rods 85 which fixedly engage the projecting portion A' of the main frame; the normal position of the die $d'$ is determined by adjusting screws or nuts 86 which limit the approach of the head 82 to the frame A'. The die $d'$ is thus normally in fixed position, but may yield in case of an oversize bar or other exceptional condition. The die $d$ is the movable die, being carried on a slide 90 slidable in ways 91 and receiving movement from the main shaft C through a train of connecting mechanism which is best shown in Figs. 1 to 4. The shaft C carries a disk 100 (which serves also as a brake drum, as hereinafter stated) on which is a crank 101 connected through a universal joint connection to a rod 102 jointed to a pivot stud on an arm 103 keyed on a rock shaft 104 which extends longitudinally of the machine and has fixed on its opposite end an arm 105, the pivot stud 106 of which is connected by a rod 107 to a pivot stud 108 on a shaft 109 (Fig. 3), which shaft turns in bearings in a bracket 110 forming part of the fixed frame of the machine; this shaft 109 carries an eccentric 111 embraced by an eccentric eye or strap 112, the rod 113 of which is jointed to the slide 90 on a pivotal stud 114. The several cranks or crank arms and the eccentric comprised in this connecting train are in such angular relations that as the crank 101 travels through a circular orbit it communicates movement through the rock shaft 104 to the shaft 109 in such manner that to each revolution of the crank two opening and closing movements are imparted to the dies. This is illustrated in the diagram Fig. 26, which shows the positions of the crank and eccentric centers, and of the shaft axes and the center lines of the connecting links. The eccentric center 111 swings through an arc, its path crossing a dead center line between the axes of 109 and 114 to bring the dies together, its movement continuing slightly beyond this line to impart a dwell to the dies in their gripping position, this dwell continuing to a corresponding angle during the return movement in manner well understood in toggle presses for giving a dwell to the blank-holder. This dwell corresponds to the extreme upper and lower positions of the crank 101, one of these positions being shown in full lines in Fig. 26. As this crank turns from either such extreme position to its mid position, it rocks the shaft 104 through a sufficient angle to carry its pivot stud center 106 to the position shown in dotted lines, where the crank radius is in line with the stud 108 (this line constituting a dead center); as the movement of crank 101 continues, it and the parts 102, 103, 105 and 107 are carried to the positions shown by dot-and-dash lines, whereby the stud 108 is moved beyond its dead center through an equal arc, bringing it down again to the position shown in full lines, and thus closing the dies together for a second time in the same revolution. Thus, to each revolution of the crank 101 the stud 106 is carried alternately to opposite sides of its central or dead center position, thereby resulting in a double oscillation of the shaft 109 and the communicating of a double movement by the eccentric center to the die-carrying slide 90. It thus results that the stock rod *a* is gripped momentarily by the dies *d d'* twice in the entire cycle of operations, and at other times the dies are retracted so that they release the hot bar and leave a slight space between the gripping faces of the dies and the bar. The moments of gripping occur while the bar requires to be held fast for the operations performed upon it; one of these gripping points occurs immediately after the feed of the bar and while the cutting and pointing dies are closing together and cutting the bar, and are moving longitudinally of the bar to pull its cut point free from the end of the gripped bar; and the other gripping period occurs during the swaging of the head of the spike by the operation of the heading hammer or die *f*. After this operation the dies necessarily open in order to permit the next forward feed of the bar, but between the cutting off and heading operations the opening of the dies is for the purpose of diminishing the duration of their forcible contact with the hot bar. It results that the dies grip the hot bar for as small a portion of the total period of the cycle of operations as possible in order, on the one hand, to avoid chilling the bar, and, on the other, to avoid the excessive heating of the die surfaces from the bar. This double gripping and releasing movement of the dies might be accomplished by cam mechanism, but the described mechanism gives a very forcible gripping movement by a toggle action and derives the double gripping movement from one rotation of the driving crank.

The oblique arrangement of the gripping dies and their slides shown in Fig. 3 is desirable because it affords a gripping engagement with all four sides of the bar, while permitting the latter to remain with its sides in horizontal and vertical planes, so that, as shown in Fig. 7, the feed rolls *b b* may turn on horizontal axes.

The function of the funnel or guide *c* through which the bar *a* is fed to the gripping dies, is not merely to guide the entering end of the hot bar accurately into the dies, but also during the feeding of the bar to separate it from both dies at each release by the dies and during each feeding movement. Since the bar is worked hot, it is desirable to avoid cooling it by too prolonged contact with the dies, and also to protect the dies against overheating. These ends are accomplished by giving the funnel a movement coincident with that of the movable member of the dies, and preferably to about one-half the extent. If both dies moved equally in opposite directions, the function of the funnel would be accomplished by keeping it stationary; but since for simplicity it is desirable to move only the die *d* (except for such movement of the die *d'* as may result from its cushioning upon the stiff springs 83), it is desirable to provide means for causing the bar to partly follow the movement of the die *d* in order to carry it out of contact with the die *d'* and permit cooling of both dies. This is accomplished by a mechanical connection shown in Fig. 1, and more clearly in Fig. 1ª, and consisting preferably of a lever 120 connected by a link 121 to a bracket 122 fixed to the main frame, so that the connection with link 121 constitutes the fulcrum of the lever; the opposite end of the lever is jointed at 122 to a projection carried by the slide 90; at an intermediate point the lever is connected by a link 123 to a slide 124 which carries the guiding funnel *c*. It results from this that the guiding funnel is given a movement coincident with that of the movable die, and to approximately one-half its extent.

Certain details of the heading and pointing dies will now be described.

Figure 18:
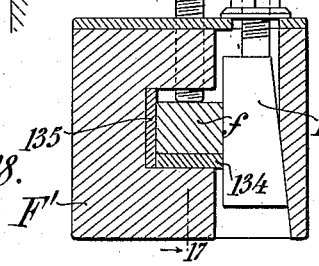
Fig. 18 is a transverse section in the plane of the line 18 in Fig. 16.
Figure 17:
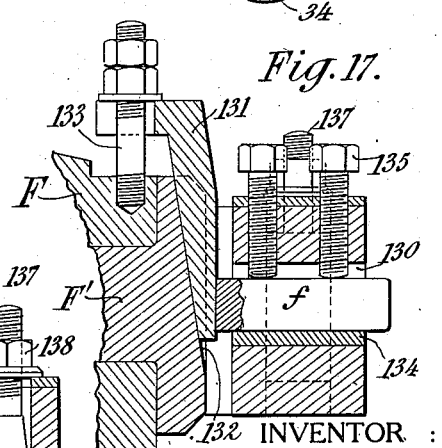
Fig. 17 is a side view of the swaging hammer and its connected parts in vertical longitudinal section, the plane of which is on the line 17 in Fig. 18.

The heading die or ram *f* is best mounted on a slide F in the manner shown in Figs. 16–18. The slide F has mounted in it a die carrier F' which has a head which is seated against the front of the slide proper. This head is provided with a recess 130 through which the heading die or ram *f* projects, and within which it may be adjustably located. It is backed against an adjusting wedge 131, which is seated in a groove 132 in the head, this groove forming an inclined seat, as shown in Fig. 17. The wedge 131 is adjustable by means of nuts on a vertical screw stud 133 (Fig. 17). The projection of the ram *f* may be varied by adjusting the wedge 131 up or down on its inclined seat 132. The ram is centered within the recess 130 to adjust it to the precise vertical and lateral positions desired by means of shims, namely, a shim 134 beneath it, the thickness of which determines the vertical position of the ram, and a shim 135 which determines its lateral position; it is tightened against these respective shims by set screws 135 bearing downwardly upon it from above, and by a laterally-acting wedge 136 tightened by a nut 138 on a screw stem 135. The heads of the screws 135 and the nut 138 are all accessible from the upper side. Thus the ram *f* may be adjusted to a nicety, and its projection may be varied to determine the precise thickness of the head of the spike and to allow for the re-grinding of its swaging face as it wears. The pointing and cutting dies are shown in detail in Figs. 8 to 15, inclusive. It is first to be observed that while the blank bar *a* is located with its respective sides in vertical and horizontal planes, and the slides G G move preferably along horizontal lines, the pointing dies g g and confining dies h h are tilted slightly from this plane, as best shown in Fig. 15, where a true horizontal plane is indicated by the dotted line y—y. This tilting is very slight, being hardly perceptible in the drawings, but is sufficient to cause the confining dies h h, when they first approach the bar, as shown in Fig. 12, and when they are moving to overlap it, as shown in Fig. 13, to ride clear of the upper and lower sides of the bar and to closely engage it only just before the pointing dies enter the bar in the position shown in Fig. 14; from this it results that the dies h work freely until their function of preventing any flow of the displaced metal up or down has to be performed, at which time they are in close touch with the bar, and as the cutting dies close together to the position shown in Fig. 15, they serve their function of confining the bar closely above and below, so as to prevent any vertical flow of the metal, and they fit together with such closeness as to avoid the formation of any fins of displaced metal.

For the adjustment of the dies g h the means shown in Figs. 8–11 are provided. The dies h are preferably extended behind the dies g, with shims 140 (Fig. 8) located behind the cutting dies to hold them out into proper relation with the bar and into cutting engagement with each other. The dies g h are bolted together by a bolt 141 working through an elongated hole to provide for the requisite adjustment by using thinner or thicker shims. The two dies thus united and adjusted are seated in a recess 142 in the slide G, being backed against a wedge 143 which in turn is seated against an inclined seat 144, the wedge 143 having a threaded stem drawn up by a nut 145 to tighten the wedge. The dies g h are pressed in vertical direction against their seats in the recess 142 by a wedge 146 which is seated against an inclined seat 147 and has a screw-threaded stem drawn up by a nut 148 to tighten the wedge. The nuts 145 and 148 are both accessible from the same side of the slide G.

Provision is made for ready and accurate adjustment of the dies g h with respect to each other and to the bar a. For adjusting the dies g h longitudinally of the stock bar a, the slides H H are displaced longitudinally by providing their rods o' with threaded portions 151 (Fig. 1) where each of these rods screws into a pivot piece 152 which makes the joint connection with the lever arm p; after making this adjustment the parts are tightened by a set nut 153. For adjusting the dies g h vertically, their carrying slides G G are raised or lowered; as these slides move in slideways j in the slides H H, it is necessary for thus adjusting the slides G G to provide that the slides H H shall be adjustable vertically, or at least so much of them as shall carry the slideways j up or down. The preferred construction is that shown (see Figs. 1, 27 and 28), wherein the slides H H are in two parts, the main slide H including the T head or transverse portion in which the slideway j is formed, this being attached adjustably to a slide section H' which is the portion engaging the slideways k k on the frame; it is the portion H' which is engaged by the sliding pieces q' embracing the rounded end of the arm q, as shown in Figs. 1 and 19, and this portion H' consequently has no vertical adjustment. The main slide H is adjustable vertically with respect to the section H', the two parts being connected through a vertical offset 154 entering a vertical groove (Fig. 28) which permits of such vertical adjustment, the two members being normally held together by four bolts 193, one of which is shown in position in Fig. 1 in full lines, and another, 193', in dotted lines. These bolts pass through holes in the part H, which, as shown in the section in Fig. 1, are large enough to afford the required adjustment. In the main frame are mounted vertically adjustable screws 150, the locations of which are shown in Fig. 1. These screws are arranged in pairs above and below the respective slides H. The slides have sliding contact with the heads of these screws. The screws of one pair are shown in Fig. 27, the lower screw being shown in full and the upper one broken away. In order to vertically adjust the slides H and G, and thereby the dies g h, the screws 193 are first slackened and then the screws 150 are adjusted up or down, as may be required, being tightened in position by their set nuts 150'.

For adjusting the machine to make different sizes of spikes, it is apparent that for a mere change in length the adjustment of the feed by displacing the stud 34 in Fig. 20 so as to vary the effective length of the arm 33 will be sufficient. For varying the size of the spike head it is necessary to provide the necessary length of bar protruding from the gripping dies after the cutting operation; for this it is necessary to set the pointing and cutting dies to operate at points more or less removed from the facial plane of the gripping dies; this is accomplished by varying the initial position of the carrier slides H H, and for this adjustment the effective length of the operating rods o' is varied by means of their threaded portions 151 and set nuts 153, as already described. For making spikes of different sizes in cross-section, it is necessary to provide new gripping dies d d', and will generally be necessary to provide a different heading hammer f and pointing dies g; also, it may become necessary to provide differently proportioned feed rolls b b.

It is an important advantage of the machine provided by this invention that it is adapted to operate at high speed and thereby turn out a greatly increased output as compared with machines heretofore existing. The machine is driven through a positively-acting clutch in order that it may be stopped always in one certain position. Such a clutch operates so suddenly as to cause too severe a shock when a machine of a given inertia is stopped or started at too high a speed. As the speed of production of the machine herein illustrated and described is considerably in excess of the limiting speed of clutch operation, provision is made for preventing the operation of the clutch except when below that speed. For this purpose a centrifugally-controlled stop is provided, so that the clutch cannot be engaged or disengaged until the driving motor speed has been reduced to below the safe speed for clutch operation. The machine is designed to be driven by an electric motor which may be gradually speeded up to the normal speed. To accomplish the speed control for proper clutching, a governor is provided which is geared up from the driving means, preferably, in the construction shown, from the driving pulley D; this governor co-operates with the starting lever or treadle to control the clutching, so that the starting lever cannot operate the clutch except at a speed at or below the practical limit.

The governor as a whole is lettered P, and may be of any suitable construction of centrifugal governor. A compact construction is shown in Fig. 1, its rotary shaft being driven by pinion engagement with a large bevel gear 155 carried by the driving pulley D. The governor construction is typical, and so well known as to require no description. The annular groove 156, between flanges on the spring-pressed sleeve which is actuated by the weighted governor arms, is entered by a roller on an arm 157 projecting from a rock shaft 158 which turns in a housing 159 and has on its lower end an arm 160 the end of which is formed as a stop 161 which moves through a given path with variations in the speed of the driving member. The machine is provided with the usual starting treadle T (or other lever) which connects through a rod 164 with a stop lever 165 which is moved by the treadle from the stopped or inactive position shown in full lines in Figs. 4 and 29, to the active or running position shown in dotted lines at 166' in those figures. The free end of the lever 165 is formed as a foot 166 constituting an abutting part which with the movement of the treadle sweeps through an arc-shaped path. So long as the speed is below the minimum for safe clutching, the foot 166 moves freely; but if the speed be too high, the stop 161 is positioned in the path of the foot 166 and intercepts it, so that it cannot move upward, and consequently the treadle cannot be depressed sufficiently to engage the clutch. The treadle has the usual connection with the clutch-engaging means, such as are commonly applied to positive action clutches, preferably those of the rolling pin type such as the well-known Bliss clutch. Such clutch-operating means are too well known to require illustration and exact description, it being sufficient to say that an arm 170 having operative connection to the treadle or to a rock-shaft actuated by the arm 165, is movable into and out of engagement with a pawl arm 171 formed on the rolling key or pawl of the clutch, so that in the position shown in full lines in Fig. 4 it intercepts this arm and presses it back so as to turn the clutch pin and disconnect the clutch; while upon the pressing down of the treadle it is moved out of the path of the arm 171 and the spring-actuated arm swings out so as to rotate the clutch pin into engagement with the corresponding notch within the hub of the pulley D and thereby couple this pulley to the main shaft C. This coupling therefore can be accomplished only when the speed is below the determined minimum, as otherwise the governor-actuated stop 161 intercepts the movement of the foot 166 carried by the lever 165.

The same mechanism serves the contrary purpose of preventing the unclutching of the driving shaft to stop the machine, except when its speed is first reduced to such rate as will permit the unclutching to be performed at a given point in the revolution. The stoppage of the machine is best performed at one particular point in its cycle, namely, just after the finished spike has been cut off and before the next heading operation, and while the gripping dies are open, so that the bar is free and may be withdrawn. To thus stop the machine it is necessary that it be slowed down to such point that upon the release of the clutch and the application of the usual brake, the machine will stop within a limited range, and preferably while the gripping dies are widest open. This result is attained by utilizing the same speed-actuated stop 161 to prevent the descent or return movement of the foot 166 so long as the machine is up to speed, since the stop 161 does not move out of the arc of movement of the foot 166 until the speed has been sufficiently reduced to enable the safe stopping of the machine. The machine, when unclutched, is stopped by any usual brake construction. That shown comprises the disk 100 which serves as a brake drum, being keyed on the main shaft C, and which turns between brake levers 175 (Fig. 2) which are pressed together by a spring 176 to embrace the drum 100 and stop the machine; the brake levers 175 are connected at one end to a fixed fulcrum stud 180, and at the other end are operated by a cam 181 forming the end portion of a rock-shaft 182 which extends across the machine, having bearings in the main frame A A, and has an operative connection with the treadle T. This connection may consist of a crank arm 183 fixed on the end of the shaft 182 and connected by a rod 184 to the lever 165 or otherwise to the treadle.

That which is essential to the speed control is the coaction of two stop members, the one connected to the starting treadle and movable thereby through a given path from a stopped position to a normal running position of the machine; the other member actuated by the speed governor and moving in a path crossing the path of the first-named member, and so related thereto that it stands in such path between the opposed positions of the first-named member whenever the speed is above that at which the machine may be safely started or stopped; and so that it moves out of such path when the speed falls to such safe speed.

It is preferable to provide for disconnecting the means for operating the hammer e in order that in stopping the machine this hammer shall fail to make its bending stroke and thus leave the cut end of the bar unbent, so that it may be readily pulled out backward. For this purpose a suitable connection is made whereby when the treadle is released to stop the machine, the driving connection for the hammer e is rendered inoperative. A convenient way of accomplishing this is to connect the arms s s' (Fig. 2ª) through the medium of a bolt 190, or other lock, which is normally engaged by a spring to lock the two arms together, but which may be withdrawn to disconnect them. For thus withdrawing it, a link 191 connects from this bolt to the operating treadle T or to any suitable part connected therewith, so that the release of the treadle, whereby it moves to the position shown in full lines in Fig. 4, pulls down the link 191 and disconnects the bolt 190.

The machine constituting thus the preferred embodiment of the invention is adapted for very accurate production of spikes at high speed, so as to give a profitable output; and is capable of adjustment to cover a considerable range of sizes and shapes or proportions of spikes.

Among other advantages of the machine provided by this invention is the important merit that the stock bar from which the spikes are made, and which when of full length is very heavy, is never moved except during the successive forward feeds. Heretofore spike machines have, at the cutting off of the finished spike, imparted to the stock bar a slight rearward displacement. Instead of this, the present machine holds the stock bar fixedly and imparts the displacement to the spike which has just been cut off and nearly or completely severed. As the weight of the spike is a small fraction of the weight of the bar, and is always uniform, while the bar is progressively diminishing in weight as successive spikes are cut from it, the movement of the spike alone upon severance from the bar enables much speedier operation than when a movement, however slight, is communicated to the entire bar.

The machine may readily be adapted to produce other articles than spikes, and to working upon a stock bar either hot or cold. Thus it is capable of producing the larger sizes of wire nails (commonly called spikes) which are used for uniting timbers in framing.

The invention is not necessarily limited to all the details of construction set forth, and it is capable of considerable modification within the scope of the appended claims.

What I claim is:

1. In a machine for making spikes or the like from a hot stock bar, the combination of feeding means, gripping dies, means for shaping the end of the bar and for cutting off the bar and means for separating the bar from said dies as they open, whereby to cool the dies, said gripping dies adapted to hold the hot bar during the shaping and cutting off.

2. A machine according to claim 1, said separating means adapted to lift the bar out of contact with the gripping dies as they open.

3. A machine according to claim 1, one of the gripping dies being movable, said separating means comprising a guide for directing the bar between the gripping dies, and operating connections with said guide for imparting movement to the latter coincidently with the movement of said die.

4. A machine comprising gripping dies and means for feeding a hot bar, one of the gripping dies being movable, combined with a guide for directing the bar between the gripping dies, and connections between the movable die and said guide, adapted to impart to the guide during the opening movement of the die a movement of less extent than that of the die to lift the bar from the die.

5. The combination of gripping dies and means for opening and closing them, a guide for directing the bar between said dies, and a lever connecting said dies and guide, adapted to move the guide to separate the bar from the dies, coincidently with the opening movement of the dies, but to a reduced extent.

6. In a spike machine, feeding, heading and pointing means, gripping dies for holding the bar, one of said dies being movable, a driving shaft having a crank stud, and die-operating means driven from said crank stud comprising a rocking part having arms, and connections from said arms to said movable die and to said shaft, adapted to impart a double movement to the movable gripping die to each rotation of the driving shaft.

7. In a spike machine, feeding, heading and pointing means, gripping dies for holding the bar, one of said dies being movable, a driving shaft, and die-operating means driven therefrom adapted to impart a double movement to the movable gripping die to each rotation of the driving shaft, and including a rocking part having a rock-arm movable through a given arc and connected to impart closing movements to the dies at its extreme movements and to open them in its intermediate position.

8. In a spike machine, feeding, heading and pointing means, gripping dies for holding the bar, one of said dies being movable, and means for moving it comprising a toggle connection straightened in the closed position and movable to one side from the closed position to open the dies, a driving shaft, and interposed means for moving the toggle between said opposite positions for imparting a double closing movement through said toggle connection, to each rotation of said shaft, one such open position coinciding with the feeding movement, and such closed positions coinciding with the heading and pointing movements respectively.

9. In a spike machine, feeding, heading and pointing means, gripping dies for holding the bar, one of said dies being movable, and means for moving it comprising a die-operating toggle movable from a straightened closed position to an open position, a driving shaft, an interposed rock-shaft having cranks, a connection between one of said cranks and the driving shaft, and a connection between another crank and the toggle, said latter connection adapted to straighten the toggle and carry it to either side of its straight position to close the dies with a dwell, and to buckle the toggle to open the dies, and said connections adapted to impart these straightening and buckling movements twice to each rotation of the driving shaft.

10. In a spike machine, feeding, heading and pointing means, gripping dies for holding the bar, one of said dies being movable, and means for moving it comprising a die-operating rocking part connected to said die, a driving shaft, and an interposed rocking part having a crank connection to said die-operating part, said crank connection movable to opposite sides of a dead center, and connected to impart closing movements to the movable die at its extreme movements and to open the dies in its intermediate position.

11. A machine for making spikes or the like from a stock bar comprising feeding means, gripping dies for holding the bar, heading means, pointing dies adapted to swage the point, and means for moving the pointing dies together and for subsequently displacing them away from the gripping dies to sever the pointed spike from the stock.

12. A machine according to claim 11, having transversely-movable slides carrying the pointing dies, and means for moving said slides away from the gripping dies.

13. A machine according to claim 11, having transversely-movable slides carrying the pointing dies, and longitudinally-movable slides carrying said transversely-movable slides, and means for imparting successive movements to said slides.

14. A machine for making spikes or the like from a stock bar, comprising feeding and gripping means and transversely-acting pointing and cutting dies, and overhanging confining dies carried therewith, said cutting and pointing dies having their active faces on their advancing sides, and said confining dies set at a slight angle to the cross-section of the bar whereby to close in upon it obliquely as the pointing and cutting dies advance into operative relation to avoid the formation of flash.

15. A machine for making spikes or the like from a stock bar, comprising feeding and gripping means and transversely-acting pointing and cutting dies, overhanging confining dies carried therewith, set at an angle to the cross-section of the bar, and transverse slides carrying the pointing and cutting dies and the confining dies, and fastening screws and wedges for removably and adjustably seating said dies in the slides.

16. A spike machine comprising gripping dies, pointing and heading dies, and a bending hammer to bend the cut-off end of the bar laterally, with driving and stopping means, and a severable connection between the driving means and hammer, operable by said stopping means, to prevent the lateral bending of the bar when the machine is stopped, so that the bar can be pulled back.

17. A spike machine comprising gripping dies, pointing and heading dies, and a bending hammer to bend the cut-off end of the bar laterally, with driving and stopping means, a driving connection between the driving means and hammer comprising a lock, and a connection with the stopping means for withdrawing said lock as the machine is stopped, whereby to prevent the operation of the hammer.

18. A spike machine comprising feeding, gripping, heading, and pointing and cutting means, adapted to operate at relatively high speed, a main shaft from which motion is communicated to said respective means, a driving member, a clutch for coupling said driving member to said shaft, a control lever for said clutch, and speed-actuated means for preventing the operation of said clutch except when the speed is below a prescribed minimum, comprising a movable foot connected to said control lever, and a stop positioned by the speed-actuated member to intercept the foot when the speed is excessive.

19. A spike machine comprising means for feeding the bar, gripping dies for holding the bar, and means for severing the spike therefrom, the gripping dies adapted to hold the bar fixedly during severance, and the severing means movable to pull the spike away from the held bar.

In witness whereof, I have hereunto signed my name.

EDWARD V. CRANE.